United States Patent [19]

Fu et al.

[11] Patent Number: 5,108,963

[45] Date of Patent: Apr. 28, 1992

[54] SILICON CARBIDE WHISKER REINFORCED ALUMINA CERAMIC COMPOSITES

[75] Inventors: Chen T. Fu; Ai K. Li, both of Hsin Chu Hsien, Taiwan

[73] Assignee: Industrial Technology Research Institute, Hsin Chu Hsien, Taiwan

[21] Appl. No.: 508,474

[22] Filed: Apr. 16, 1990

Related U.S. Application Data

[63] Continuation of Ser. No. 304,602, Feb. 1, 1989, abandoned.

[51] Int. Cl.$^5$ .................. C04B 35/10; C04B 35/56
[52] U.S. Cl. .................................. 501/89; 501/95; 501/91
[58] Field of Search ................. 501/89, 95, 91

[56] References Cited

U.S. PATENT DOCUMENTS

| | | | |
|---|---|---|---|
| 4,681,861 | 7/1987 | Saito | 501/91 |
| 4,789,277 | 12/1988 | Rhodes et al. | 501/89 |
| 4,804,645 | 2/1989 | Ekstrom | 501/132 |
| 4,849,381 | 7/1989 | Brandt et al. | 501/89 |

Primary Examiner—William R. Dixon, Jr.
Assistant Examiner—Sue Hollenbeck
Attorney, Agent, or Firm—Cushman, Darby & Cushman

[57] ABSTRACT

The flexural strength and fracture toughness of SiC whisker-reinforced ceramic composite are increased and the sintering temperature of the composite is lowered by the addition of chromia. The starting materials for the fabrication of the composite consist of SiC whiskers, chromia and alumina which during hot pressing will yield alumina-chromia solid solution, the matrix, and $Cr_3C_2$ particles as individuals or coherently bonded to the ends of the whiskers, the reinforcements evenly distributed in the matrix.

In the formation of the ceramic composites, the SiC whiskers are mixed with chromia and alumina. The mixture is hot pressed at pressures in a range of about 5 to 50 MPa for a duration about 0.2–2 hours and at temperatures of about 1350° to 1650° C. to provide a composite with a relative density greater than about 97% of theoretical density.

5 Claims, 5 Drawing Sheets

(a)

(b) chipping

SILICON CARBIDE WHISKER REINFORCED ALUMINA CERAMIC COMPOSITES

This is a continuation of application Ser. No. 07/304,602, filed on Feb. 1, 1989, which was abandoned.

BACKGROUND OF THE INVENTION

This invention relates to the improvement of silicon carbide whisker reinforced alumina based ceramic composites and method for making same. Ceramics is one of the most promising materials to be used in high-technology industries. Owing to its excellent properties of mechanical strength, hardness, high temperature stability as well as corrosion resistance, it has a great potential in the applications in high-temperature environments. However brittleness and low reliability are the two main problems limiting its use. Therefore, a large portion of current research work is aimed at making tougher ceramic materials. The experiences in making metallic composites and fiber reinforced photic may be followed in manufacturing of ceramic matrix composites. The evidences have shown that this method can effectively and significantly improve the toughness of ceramic materials and, thus, reduce the occurances of catastraphic failures.

Generally speaking, ceramic composites may be categorized according to the reinforcements being used: fibers or particulates. In early years, polycrystalline silicon carbide fibers are in corporated into the ceramic matrix. The material is strengthened and toughened through the mechanisms of crack deflection and fiber pullout. However, the length fibers cause fabricating process difficult and the oriented microstructure consequently will lead to the anisotropy of mechanical strength in the material. Moreover, S:C, owing to the metallic impurities devived from fabricating process begins to soften at temperatures as low as 900° C. and losing its strengthening effect. Therefore, polycrystalline S:C fibers are gradually replaced by single crystal S:C whiskers. The advantages of using whiskers are that is makes composite fabrication easire, and that the composite babricated has high-temperature resistance. The main drawback of S:C whiskers (or fibers) reinforced ceramics is originated in the low thermal expansion coefficient of S:C which is, for instance, about half of that of alumina. This would generate residual tensile stress in the composite and damage its mechanical strength. Especially if the amount of S:C whiskers added is more than 30–40 vol. %, the strength and toughness would be adversely affected. This phenomenon has been widely reported in relevant literatures.

Adding heterogeneous ceramic granules or particles (mostly carbides, such as titanium carbide and boron carbide) in ceramic matrix, will also reinforce the composite according to the toughening principles of crack deflection and crack bridging. Addition of carbide particles is convenient for fabrication steps. However, the toughening effect is not so significant as with the addition of fibers.

Both methods described above for the manufacture of ceramic composites require very high sintering-temperature to gain full densed material in order to develope the desired mechanical properties consequently. This would somewhat limit the attempt of making use of this kind of material because of its high production cost.

Several inventions in S:C whiskers reinforced ceramic composites are found in U.S. Pat. Nos. 4,634,608 and 4,657,877, and Japanese Patents No. 61-270266, No. 61-286271 and No. 62-235266, whose raw materials consisting:

(a) 10–40 vol. % S:C whiskers.
(b) 7–35 wt. % Zirconia ($ZrO_2$)
(c) 0.7–7 wt. % sintering additives for alumina, including 0.7 to 7 wt. % at least one of the following oxides: calcium oxide, magnesia, silica dioxide, nickel oxide, yttrium oxide or lanthanum oxide.
(d) 0.05 to 5 wt. % sintering additives for silicon carbide, including boron, carbon, aluminum nitride, boron carbide and borides of silicon, aluminum and nitrogen.
(e) 5–30% carbides, borides, nitrides or oxides of group IVA, VA, VIA elements in the periodic table.
(f) Alumina constituting the balance.

Although the ceramic composites described in abovementioned pattents are better than single-phase ceramics in some aspects of mechanical properties, drawbacks still remain as listed in the following:

(1) As disclosed in U.S. Pat. No. 4,657,877 and Japanese Patent 62-265182, zirconia is incorporated into a ceramix matrix as a toughening agent. Zirconia particles can transform from cubic to monoclinic crystal symmetry and because of its volumetric expansion, compressive stress formed in the tip region of cracks, and break the cracks into many microcrack. Phase transformation and microcracking both dissipate the energy for crack propagation, and hence gain the toughening effect. However, in the high-temperature conditions (higher than 1,100° C.) cubic zirconia becomes stable and no phase transformation will take place in the ceramic composites. Therefore, no toughening effect will be observed. This material is not to be used higher in temperatures than 1,100° C. Besides, the addition of zirconia will cause the hardness of the composites decline.

(2) As disclosed in Japanese Patent No. 62-235266, the composition of the invented composites therein consists of (a), (d), (e) and (f). To gain densification of alumina matrix and good mechanically interfacial bonding the sintering temperature has to be raised to higher than 1,650° C.

(3) As disclosed in Japanese Patent No. 62-235266 and No. 62-41776, the composition of the ceramic composite consists of (a), (c), (d), (e) and (f). A sintering additive for alumina is added. The sintering temperature of the composition is still very high in the range of 1,650°–1,850° C., for acquiring full densification of the composites. The added component does not show any toughening effect. Otherwise, it will reduce the toughness because of inhomogeneous material.

SUMMARY OF THE INVENTION

This invention relates to the improvement of silicon carbide whiskers reinforced alumina based composites and its fabricating method. Characterized by the addition of chromia to $Al_2O_3$—SiC (whisker) system, this invention improves the flexural strength and fracture toughness of the composite while the sintering temperature can be lowered. Sorted silicon carbide whiskers, high purity alumina and chromia powders are mixed and hot-pressed to obtain a highly-densed composite. During the hot-pressing process, chromia has undergone two reactions: One is with alumina to form alumina-chromia solid solution ($Al_{2-2x}C_{12x}O_3$), another is with silicon carbide whiskers to form chromium carbide particles which are only formed at both tips of whiskers. The formation of alumina-chromia solid solution, which is then the matrix phase after hot-pressing, provides two favorable results in making this composite material. Alumina chromia solid solution gives greater Young's modulus than pure alumina does, thus, stronger matrix phase is expected in this newly invented composite. In addition, the ionic diffusivity of the alumina chromia solid solution is greater than pure alumina and the sintering temperature may be substantially reduced for saving energy. For instance, sintering temperature can be reduced from 1,850° C. (for $Al_2O_3/SiC$ whisker system) to lower than 1,550° C. (for $Al_{2-2x}C_{12}O_3/SiC$ whisker system of this invention).

The formation of chromium carbide particles is considered a contributing factor to strengthening mechanisms and toughening phenomena observed in this composite.

After chromium carbide particles are formed at both ends of SiC whiskers, the morphology of the whiskers can be envisaged as a dumb-bell shape. Enlarged chromium carbide particles provide a lacking effect during the whisker pull-out process and consequential toughening effect emerges. Another function of chromium carbide particles is to offset the residual tensile stress formed between SiC whiskers and the matrix phase. Since the thermal expansion coefficient of chromium carbide is greater than the matrix phase, it brings about a compressive residual stress in the matrix phase. Therefore, these two residual stresses will be offset and give a better mechanical property to the composite.

DETAILED DESCRIPTION OF THE INVENTION

This invention is related to a SiC whiskers reinforced alumina based ceramic composite which shows improved mechanical properties and sinterability through the addition of chromia. Its strengthening and toughening mechanisms are originated from several aspects. The first one is the in-situ formation of chromium carbide particles which are coherently bonded to the tips of silicon carbide whiskers, modifying the morpholoy of silicon carbide whisker to domb-bell shape. A looking effect, generated by modular chromium carbide particles attaching to the ends of individual whiskers, makes more energy having to be dissipated during the whisker pull-out process. Some uniformly distributed chromium carbide particles, a reaction product very short SiC whiskers and chromia, may also be toughening the material through crack deflection and bridging mechanisms. Secondly, the presence of chromium carbide particles may substantially offset the tensile residual stress, existing in the matrix phase in $SiC/Al_2O_3$ system by introducing a compressive residual stress due to the difference in the magtitudes of the thermal expansion coefficients of these three components which are in the other of $Cr_3C_2$, $Al_{2-x}Cr_xO_2$, and SiC ($\alpha Cr_3C_2 > \alpha Al_{2-x}Cr_xO_3 > \alpha sic$). Thirdly, alumina and chromia can form completely solid solution and give greater Young's modulus than pure alumina does. Thus, matrix phase is strengthened. Furthermore, $Cr^{3+}$ ion has a greater diffusivity than $Al^{3+}$ ion does. By replacing $Al_2O_3$ matrix phase by $Al_{2-x}Cr_xO_3$, therefore, the sinterability of the composite can be improved and this advantage is manifested in lowered sintering temperatures observed in the experiments.

Figure 1:
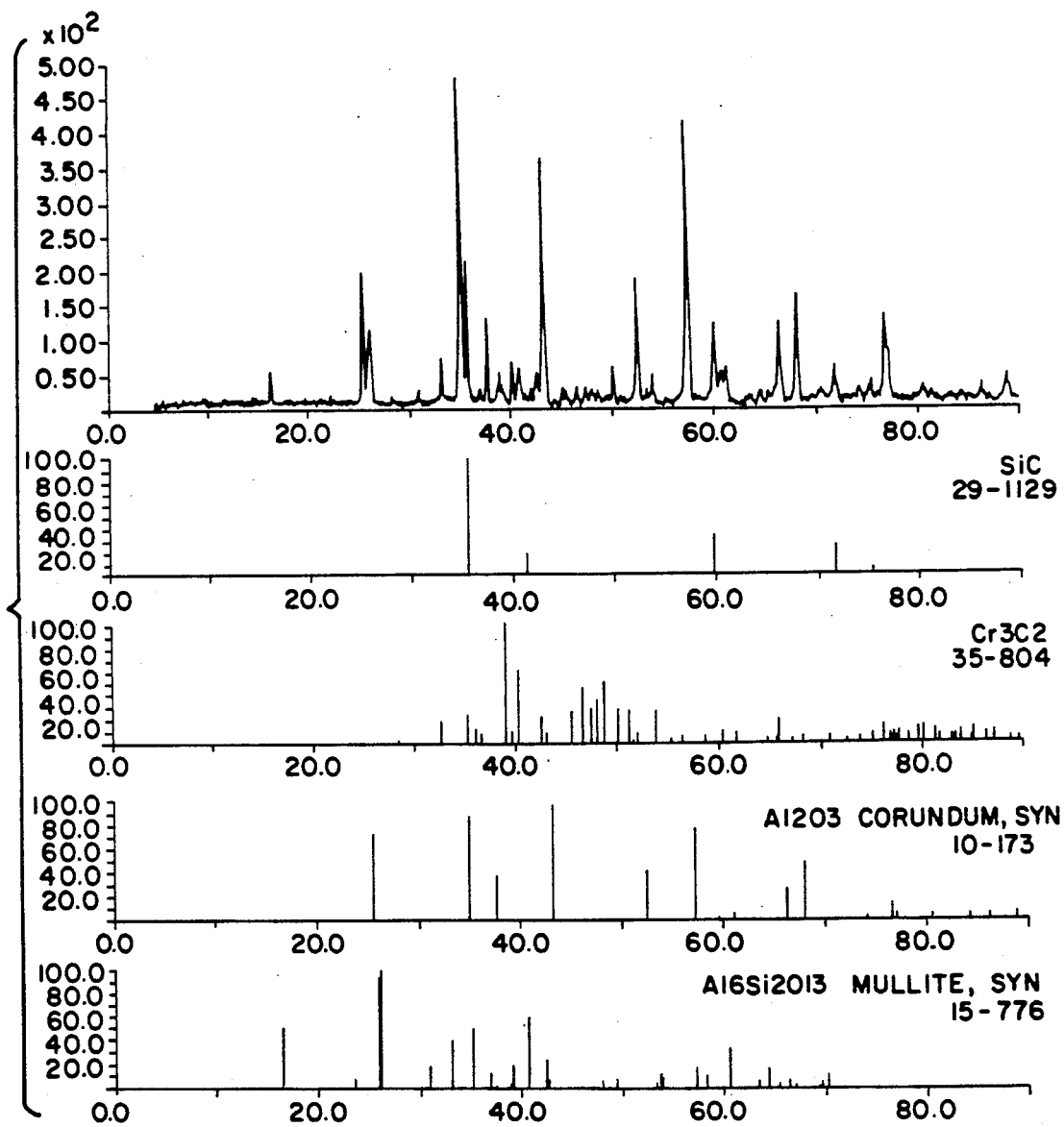
FIG. 1: X-ray diffraction patterns show the reaction products after adding chromia in the SiC whiskers reinforced alumina composite consisting of silicon carbide, chromium carbide, alumina and mullite. The specimen consists of 30 vol. % SiC whiskers, 10 mol % chromia and alumina matrix. The sintering conditions are 1,550° C., 30 MPa, and 1 hr.

The starting materials for this invention are SiC whiskers, alumina and chromia. To have SiC whiskers evenly distributed in matrix phase, a slurry-making process is employed. The starting materials are wet-milled in a ball mill in deionized water to form a slurry which is further homogenized through a sonification process. The homogenized slurry is rapidly dried under a continuous agitation condition. Dried powders are lightly ground to pass 60-mesh sieve and then are put into a boron nitride coated graphite die for sintering steps. Compacted powder is densified through a hot-pressing process conducted at temperatures ranging from 1,350° to 1,650° C., under 30 MPa pressure in an inert gas atmosphere for 0.2 to 2 hrs. The hot-pressed composites can give relative densities ranging from 97% to 99% depending on their compositions and processing conditions. The product of this invention essentially consists of silicon carbide whiskers capped with modular chromium carbide particles at both ends, chromium carbide particles, and alumina-chromia solid solution with the former two being the dispersed phases while the latter one being the matrix phase. X-ray diffraction patterns in FIG. 1 shows that mullite phase also exists in the composite. The reactions occured among the starting materials can be expressed as the following equations:

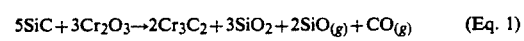

$$5SiC + 3Cr_2O_3 \rightarrow 2Cr_3C_2 + 3SiO_2 + 2SiO_{(g)} + CO_{(g)} \qquad \text{(Eq. 1)}$$

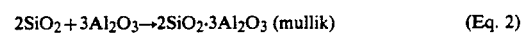

$$2SiO_2 + 3Al_2O_3 \rightarrow 2SiO_2 \cdot 3Al_2O_3 \text{ (mullik)} \qquad \text{(Eq. 2)}$$

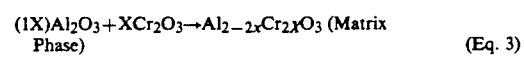

$$(1X)Al_2O_3 + XCr_2O_3 \rightarrow Al_{2-2x}Cr_{2x}O_3 \text{ (Matrix Phase)} \qquad \text{(Eq. 3)}$$

Figure 2A:
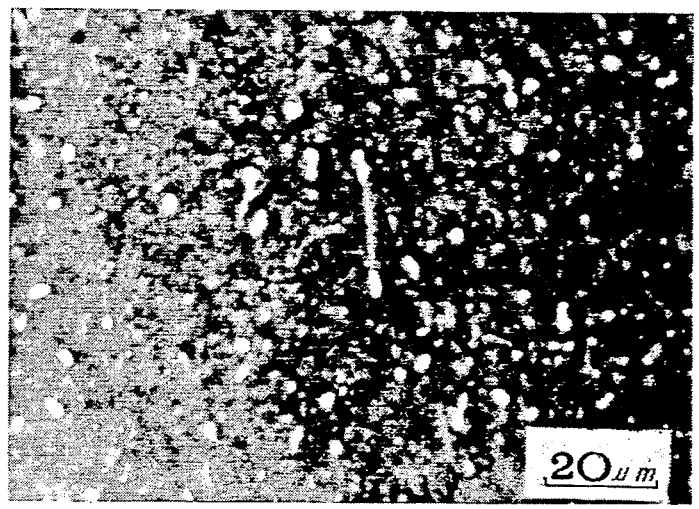
FIG. 2($a$): An optical microscope micrograph shows the $Cr_3C_2$ particles can exist both as individuals or bonded to both ends of SiC whiskers. ($b$): A TEM micrograph shows the $Cr_3C_2$ formed at the end of a SiC whisker. The bonding between them is coherent.
Figure 2B:
Figures 3A, 3B:
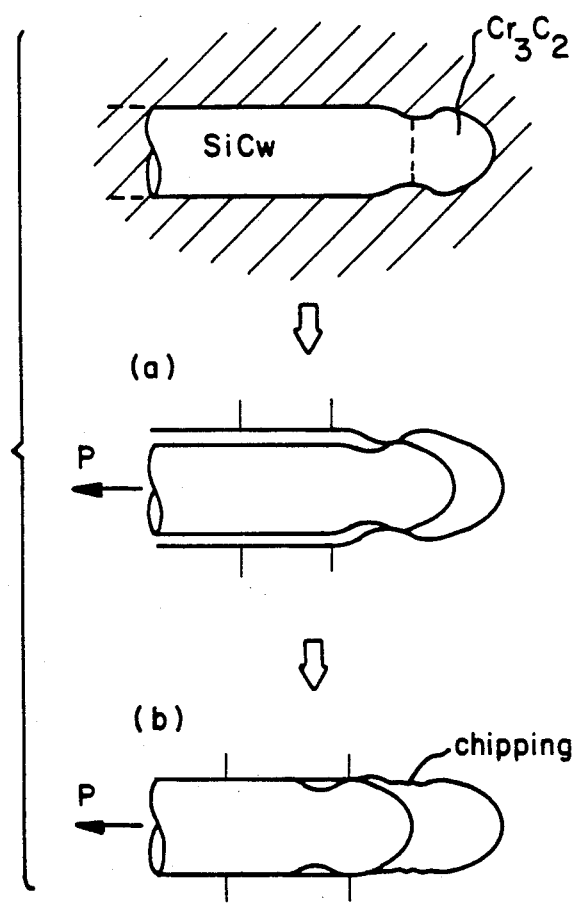
FIG. 3: A schematic of sesidual stresses at the interfaces between matrix phase and SiC whiskers or $Cr_3C_2$ particles. (A) showing $Cr_3C_2$ formed at both ends of SiC whiskers. The pull-out of SiC whiskers requires more energy than case (B) wherein no $Cr_3C_2$ is formed.

The formation of chromium carbide particles at both ends of a silicon carbide whisker is shown in FIG. 2a. Because of the thinness of SiC whiskers (with diameter—0.6 um), it is very difficult to have a sectioned sample with its surface parallel exactly to a whisker's longitudinal direction. Using TEM, a close look of the morphology of $Cr_3C_2$ particle and how it is bonded to the ends of SiC whiskers is shown in FIG. 2b. An electron diffraction pattern taken at the boundary between $Cr_3C_2$ particle and SiC whisker shows a pattern matching perfectly with SiC's diffraction pattern indicating the bonding between them is coherent. Fracture surface of bending test bars also shows that, after pull-out process, whiskers still have $Cr_3C_2$ particles bonded at tips. This shows that the bonding betweem SiC whisker and $Cr_3C_2$ particle is very strong. The TEM micrograph also shows that the modular $Cr_3C_2$ particle has a greater diameter than that of SiC whisker. During the crack propagation process, $Cr_3C_2$ particle provides a locking effect on the pull-out of SiC whisker. Toughening effect is then caused by more energy dissipation. This mechanism can be illustrated by a shematic diagram shown in FIG. 3.

Figure 4B:
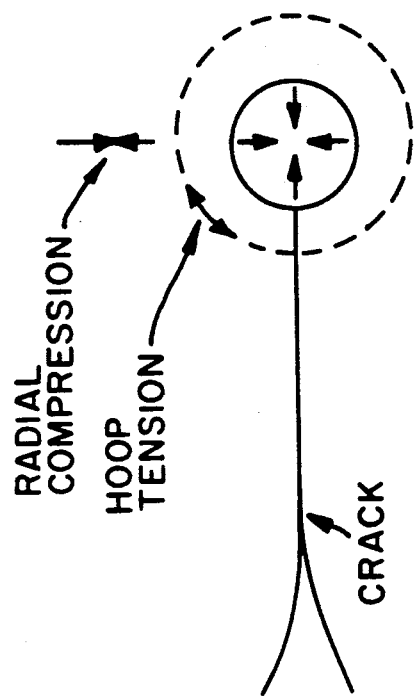
FIG. 4: a schematic showing the influence of residual stress on a propagating crack.
Figure 4A:
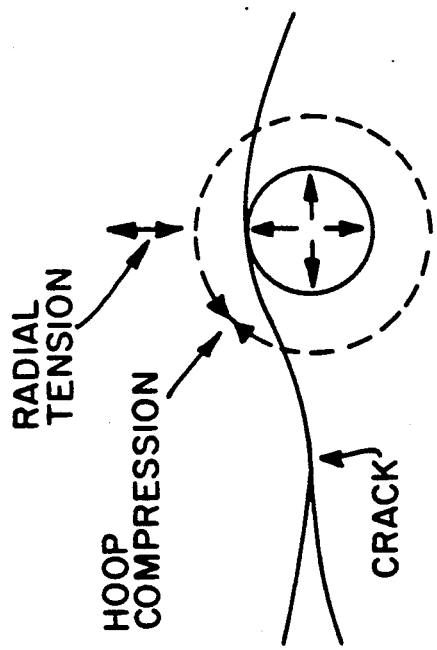

The formation of chromium carbide initiated at the ends of silicon carbide whiskers and then grew toward each other during the hot-pressing step. For short SiC whiskers, the whole whisker reacted with chromia and yielded individual chromium carbide particles which are observed as bright spots shown in FIG. 2a. The thermal expansion coefficient of chromium carbide is greater than that of $Al_{2-2x}Cr_{2x}O_3$. After sintering, the sample was being cooled to room temperature. Because of the differences of the thermal expansion coefficients, ($\alpha$particle>$\alpha$matrix), the chromium carbide particles will show a greater shrintage than $Al_{2-2x}Cr_{2x}O_2$ matrix phase will. Thus a compressive residual stress is formed in the matrix phase while a tensile one formed in the partide. On the other hand, the thermal expansion coefficient of silicon carbide is lesser than that of $Al_{2-2x}Cr_{2x}O_3$ ($\alpha$whisker<$\alpha$matrix). A tensile residual stress is formed in matrix phase while a compressive one formed in the whisker. For a bulk material, these two residual stresses may be offset and leave the material in a nearly stress-free condition. This shows that the addition of chromia can strengthen the $Al_2O_3$/SiC composite by eliminating its residual tensile stress. In local regions, however, the residual stresses still exist. And the influence of residual stress on a propagating crack is illustrated in FIG. 4. Both chromium carbide particle and silicon carbide whisker can deflect crack direction, although the mechanisms are not the same. Since crack front will propagate parallel to compression and vertical to tension, crack will be expelled from $Cr_3C_2/Al_{2-2x}Cr_{2x}O_3$ interface and deflect around the particle (FIG. 4a, $\alpha$particle>$\alpha$matrix) while crack will be attracted toward $SiC/Al_{2-2x}Cr_{2x}O_3$ interface and deflect along the interface (FIG. 4b, $\alpha$whisker<$\alpha$matrix). Previous analysis shows that chromium carbide particles can also enhance the toughness of the composite material through a crack-deflection mechanism.

The formation of alumina-chromium solid solution, whose Young's modulus is greater than pure alumina, hence, strengthen the matrix phase. Referring to Griffith rule, the fracture strength is proportional to the Young's modulus of the matrix phase and the toughness of composite material may be correlated. It has been reported that $Cr^{3+}$ ion has a diffusion coefficient several orders of magnitude greater than that of $Al^{3+}$ ion. Thus, alumina-chromia solid solution has a greater diffusion rate than alumina as demonstrated by one of the inventor's previous work. The experimental results shows that nearly full-dense $Al_{2-2x}Cr_{2x}O_3$/SiC composites can be obtained at or lower than 1,500° C. which is more than 300° C. lower than the temperature used for hot-pressing of $Al_2O_3$/SiC composites. Lowering processing temperature is very favorable for industrial applications.

Figure 5A:
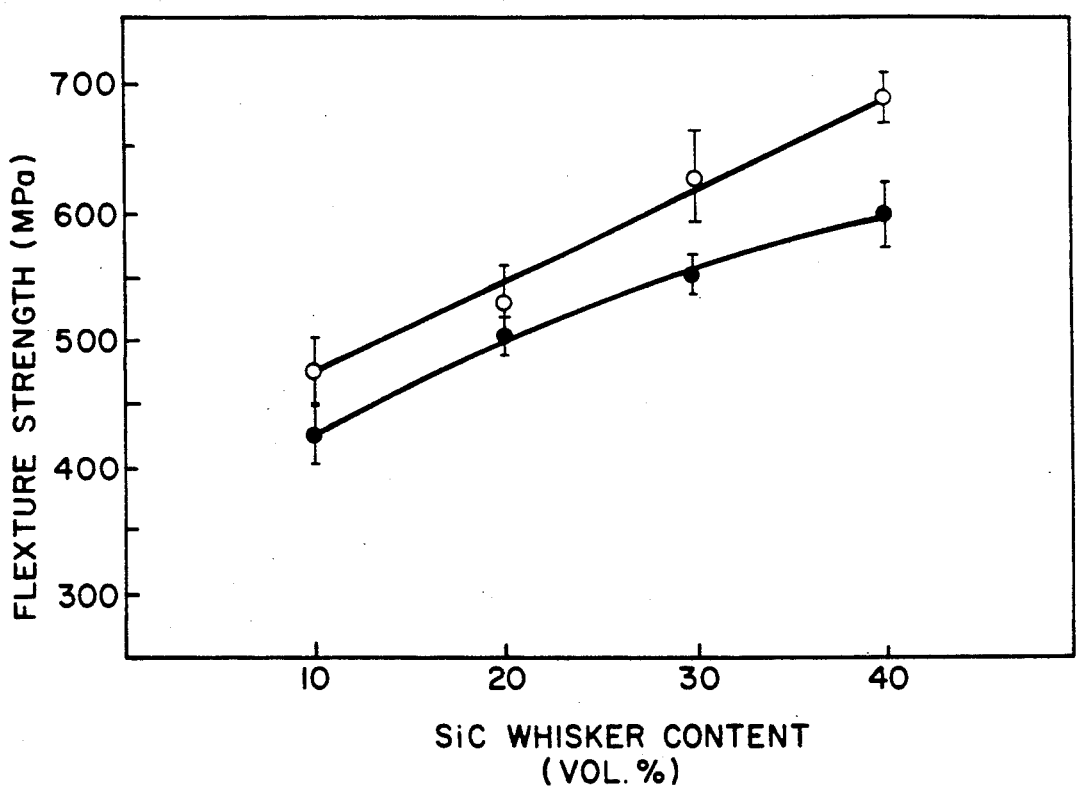
FIG. 5: The influence of $Cr_2O_3$ on the mechanical properties of SiC whiskers reinforced alumina composite as a function of SiC whiskers content.
Figure 5B:
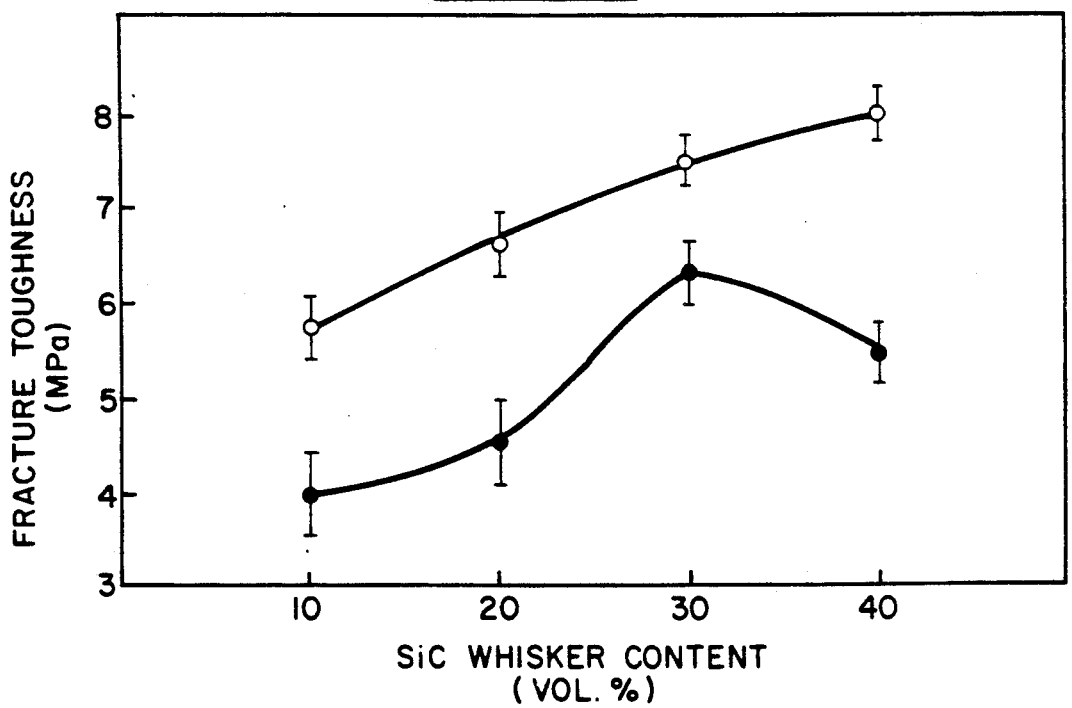

The results of 4-point bending and single-edge-notched bend (SENB) tests indicate that the flexural strength and fracture toughness of this invention are much better than that of SiC whiskers/$Al_2O_3$ matrix composites without the addition of chromia (FIG. 5).

EXAMPLE

A mixture of 5-50 vol % silicon carbide whiskers and 2-50 vol % high purity chromia powder with the balance being alumina powder was added to suitable amount of deionized water to form a slurry. The slurry was ball-milled for 2 hours and then homogenized using sonification for 10 min. The homogenized slurry was quickly dried with continuous agitation. Dried powder was shieved to pass 60 mesh and then pressed to form disks with a diameter of 6 in. The preshaped disk was placed in a boron nitride coated graphite mould and hot-pressed at a temperature ranging from 1,350° C. to 1,650° C., under a pressure of 5-50 MPa for 0.2-2 hrs. in vacuum or in argon atmosphere. The hot-pressed sample was ground on both sides by 600-mesh diamond wheel and then sectioned into 3 mm×4 mm×36 mm bending bars used to determine the flexural strength of the composite at room temperature. Fracture toughness was measured using single edge notch bend method.

A bar was precracked by cutting a notch about 1 mm deep and 0.15 mm wide. Each datum point represents the average value of the results obtained at least from 6 specimens. The bending strength and fracture toughness increased along with SiC whisker content from 480 MPa and 5 MPa.m$\frac{1}{2}$(10% SiC) to 700 MPa and 8 MPa.m$\frac{1}{2}$(40% SiC) respectively (FIG. 5). Compared with $Al_2O_3$/SiC composite, the bending strength of this invention increased around 70 MPa for each 10% increase in SiC content. The increase of fracture toughness for samples containing at least 30 vol % SiC whiskers is totally different from that of $Al_2O_3$/SiC composites which show a decline in KIC values.

While the invention has been described with respect to the preferred embodiment, it is not intended to limit the scope if the invention thereby, but solely by the claims appended hereto.

We claim:

1. A SiC whisker-reinforced ceramic composite characterized by at least one of increased flexural strength improved sintering characteristics and fracture toughness through the addition of chromia, comprising a composite defined by a matrix of alumina-chromia solid solution and reinforcements of individual $Cr_3C_2$ particles and SiC whiskers with $Cr_3C_2$ particles bonded to the ends of said SiC whiskers which are uniformly distributed in said matrix therein, said components of said matrix and said particulate reinforcements all being in-situ reaction products of the starting raw materials of said SiC whisker-reinforced ceramic composite said composite having a density of greater than 97% of theoretical density.

2. The SiC whisker-reinforced ceramic composite described in claim 1 wherein the content of SiC whiskers is about 5-50 vol %, said whiskers having a size range of about 0.2-2.0 um in diameter and a length of about 3-50 um.

3. The SiC whisker-reinforced ceramic composite recited in claim 1 wherein the content of chromia is in the range of about 2-50 mol %.

4. The SiC whisker-reinforced ceramic composite setforth in claim 1 wherein the content of $Cr_3C_2$ particles is about 1-30 vol %.

5. A method for preparing a SiC whisker-reinforced ceramic composite having at least one of increased flexural strength and fracture toughness and improved sintering characteristics, comprising the steps of:

a) preparing a slurry by mixing in deionized water 5-50 vol % SiC whiskers having a size range of about 0.2-2.0 um in diameter and a length of about 3-50 um, 2-50 mol % chromia and alumina constituting the balance, b) ball milling the slurry for 2 hours, followed by homogenizing the slurry by sonification, with 20-200 KHz, for 5-50 min, c) rapidly drying the homogenized slurry by continuous agitation followed by passing the dried mixture through a 60-mesh sieve, d) hot pressing the mixture in vacuum or in argon atmosphere at a temperature of about 1350°-1650° C. and under a pressure about 5 to 50 MPa for a duration of about 0.2-2 hours to provide a composite with a relative density greater than about 97% of theoretical density of the composite material.

* * * * *

UNITED STATES PATENT AND TRADEMARK OFFICE
CERTIFICATE OF CORRECTION

PATENT NO. : 5,108,963　　　　　　　　　　Page 1 of 5
DATED　　　 : Apr. 28, 1992
INVENTOR(S) : Chen T. Fu, et al It is certified that error appears in the above-indentified patent and that said Letters Patent is hereby corrected as shown below:

Column 1, line 18, before "brittleness", insert ",".

Column 1, line 22, Change [photic] to -- plastic --.

Column 1, line 26, Change [occurances] to -- Occurance--.

Column 1, line 27, Change [failures] to -- failure --.

Column 1, line 31, Change [are] to -- were--.

Column 1, line 31, Change [in corporated] to -- incorporated --.

Column 1, line 34, Change [length] to -- lengthy --.

Column 1, line 37, Change [S:C] to -- SiC--.

Column 1, line 38, Change [devived] to -- derived --.

Column 1, line 41, Change [S:C] to -- SiC --.

Column 1, line 42, Change [S:C] to -- SiC --.

Column 1, line 43, Change [is] to -- it --.

Column 1, line 43, after "fabrication", insert "process".

Column 1, line 43, change [easire] to -- easier --.

Column 1, line 43, delete [that].

UNITED STATES PATENT AND TRADEMARK OFFICE
CERTIFICATE OF CORRECTION

PATENT NO. : 5,108,963
DATED : Apr. 28, 1992
INVENTOR(S) : Chen T. Fu, et al

It is certified that error appears in the above-indentified patent and that said Letters Patent is hereby corrected as shown below:

Column 1, line 44, delete [babricated has] and insert in its place -- exhibits --.

Column 1, line 47, Change [S:C] to -- SiC --.

Column 1, line 50, Change [S:C] to -- SiC --.

Column 1, line 51, delete [30-40], and insert in its place -- 30 --.

Column 1, line 65, change [full] to -- fully --

Column 1, line 37, before "owing", insert -- fiber, --.

Column 2, line 1, change [S:C] to -- SiC --.

Column 2, line 6, change [S:C] to -- SiC --.

Column 2, line 10, delete [magnesia], and insert in its place -- magnesium oxide --.

Column 2, line 10, change [silica] to -- silicon --.

Column 2, line 27, delete [cubic], and insert in its place -- tetragonal --.

Column 2, line 29, delete [break], and insert in its place -- blunt --.

UNITED STATES PATENT AND TRADEMARK OFFICE
CERTIFICATE OF CORRECTION

PATENT NO. : 5,108,963
DATED : Apr. 28, 1992
INVENTOR(S) : Chen T. Fu, et al

It is certified that error appears in the above-indentified patent and that said Letters Patent is hereby corrected as shown below:

Column 2, line 30, change [microcrack] to -- microcracks --.

Column 2, line 34, delete [cubic], and insert in its place -- tetragonal --.

Column 2, line 37, delete [higher].

Column 2, line 37, delete [in], and insert in its place -- at --.

Column 2, line 38, before "than", insert -- higher --.

Column 2, line 68, change $[Al_{2-2x}C_{12x}O_3]$ to read -- $Al_{2-2x}Cr_{2x}O_3$ --

Column 3, line 14, delete $[Al_{2-2x}C_{12}O_3/SiC]$, and insert in its place -- $Al_{2-2x}Cr_{2x}O_3/SiC$ --.

Column 3, line 23, change [lacking] to -- locking --.

Column 3, line 46, change [sesidual] to -- residual --.

Column 3, line 68, change [looking] to -- locking --.

Column 4, line 1, change [modular] to -- nodular --.

Column 4, line 5, delete "very", and insert in its place -- of --.

UNITED STATES PATENT AND TRADEMARK OFFICE
CERTIFICATE OF CORRECTION

PATENT NO. : 5,108,963
DATED : Apr. 28, 1992
INVENTOR(S) : Chen T. Fu, et al

It is certified that error appears in the above-indentified patent and that said Letters Patent is hereby corrected as shown below:

Column 4, line 14, change [other] to -- order --.

Column 4, line 14, change $[Al_{2-x}Cr_xO_2]$ to -- $[Al_{2-2x}Cr_{2x}O_3]$ --.

Column 4, line 14, change $[\alpha Cr_3C-]$ to -- $\alpha Cr_3C_2$ --.

Column 4, line 15, delete [2] (first occurance).

Column 4, line 15, change $[\alpha Al_{2-2x}Cr_xO_3]$ to -- $\alpha Al_{2-2x}Cr_{2x}O_3$ --.

Column 4, line 15, change $[\alpha sic]$ to -- $\alpha SiC$ --.

Column 4, line 20, change $[Al_{2-x}Cr_xO_3]$ to -- $Al_{2-2x}Cr_{2x}O_3$ --.

Column 4, line 42, change [modular] to -- nodular --.

Column 4, (Eq.2), change [mullik] to -- mullite --.

UNITED STATES PATENT AND TRADEMARK OFFICE
CERTIFICATE OF CORRECTION

PATENT NO. : 5,108,963
DATED : Apr. 28, 1992
INVENTOR(S) : Chen T. Fu, et al

It is certified that error appears in the above-indentified patent and that said Letters Patent is hereby corrected as shown below:

Column 4, (Eq.3), change [IX] to -- 1-X --.

Column 5, line 8, change [modular] to -- nodular --.

Column 6, line 31, change [$m^{\frac{1}{2}}$] to -- $m^{\frac{1}{2}}$ --.

Column 6, line 32, change [$m^{\frac{1}{2}}$] to -- $m^{\frac{1}{2}}$ --.

Column 6, line 38, change [KIC] to -- $K_{IC}$ --.

Column 2, line 44, before "the", insert -- , --.

Column 6, line 25, delete "notch bend", and insert in its place -- notched beam --.

Signed and Sealed this

Sixth Day of June, 1995

BRUCE LEHMAN

Attest:

Attesting Officer

Commissioner of Patents and Trademarks